No. 779,415. PATENTED JAN. 10, 1905.
L. A. DÉSY.
TRENCHING MACHINE.
APPLICATION FILED APR. 11, 1904.
10 SHEETS—SHEET 4.
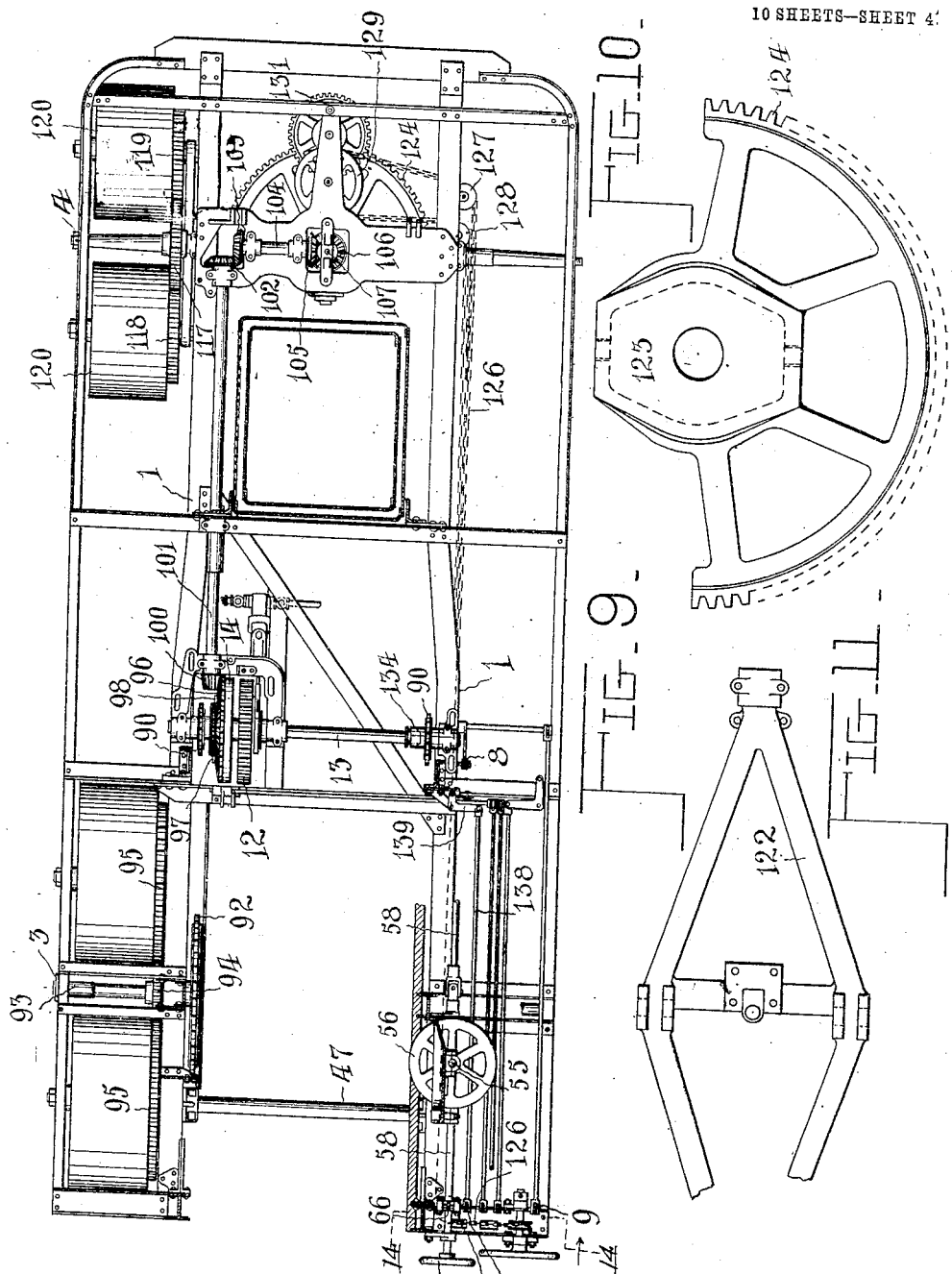
Witnesses:
Louis A. Désy Inventor,
By Marion & Marion
Attorneys No. 779,415. PATENTED JAN. 10, 1905.
L. A. DÉSY.
TRENCHING MACHINE.
APPLICATION FILED APR. 11, 1904.
10 SHEETS—SHEET 5.
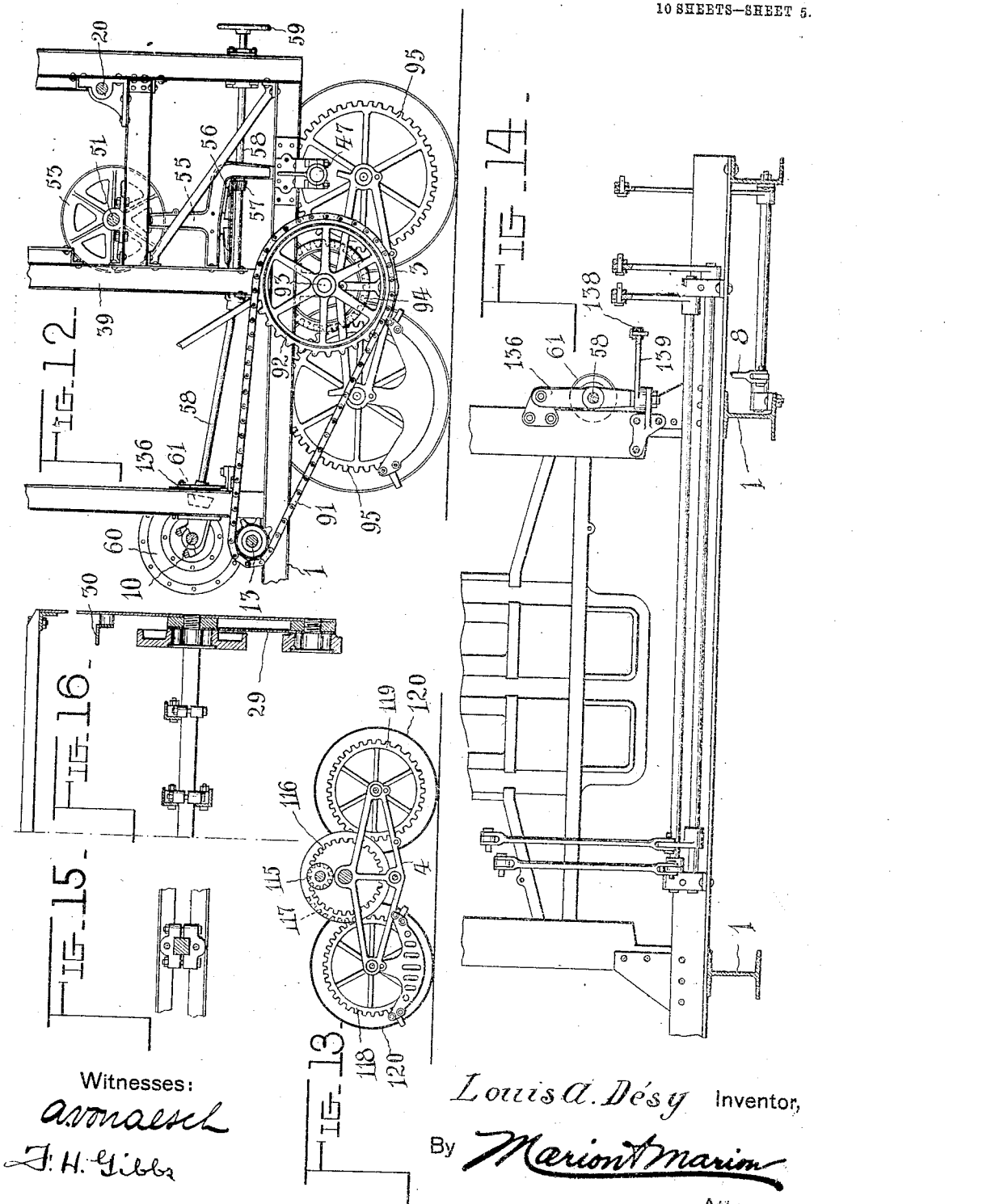

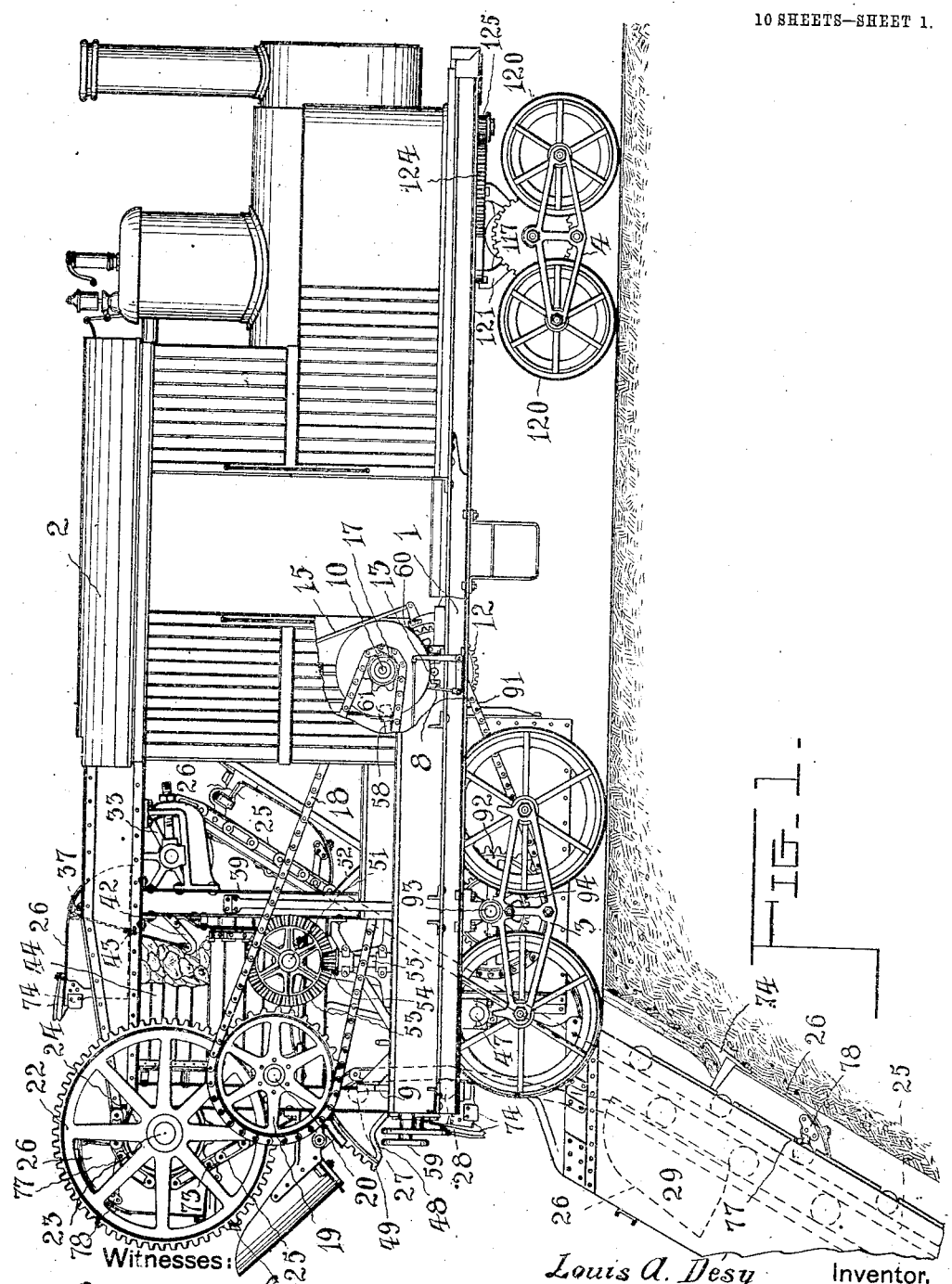

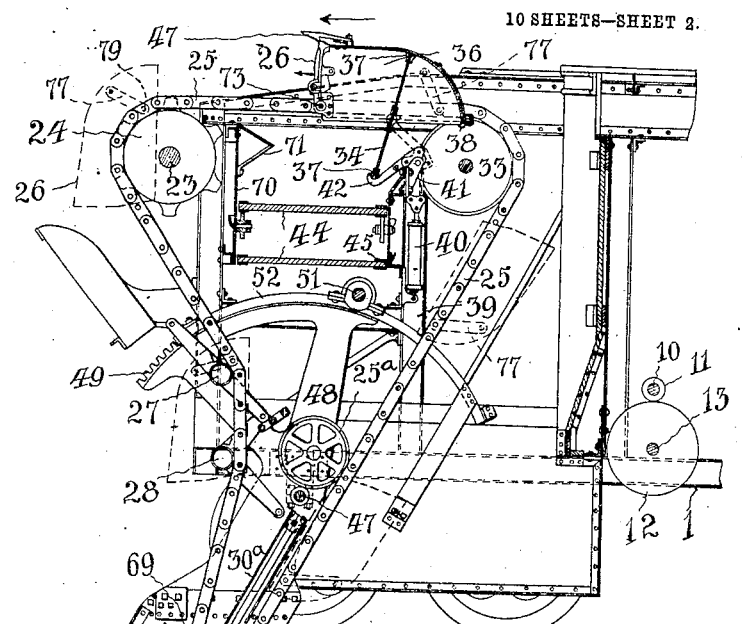
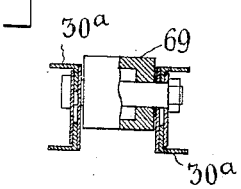
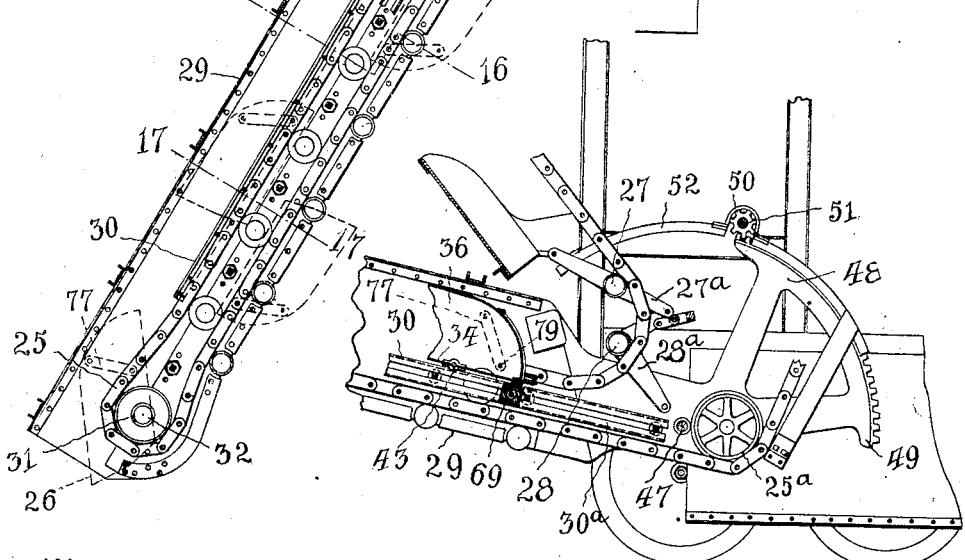

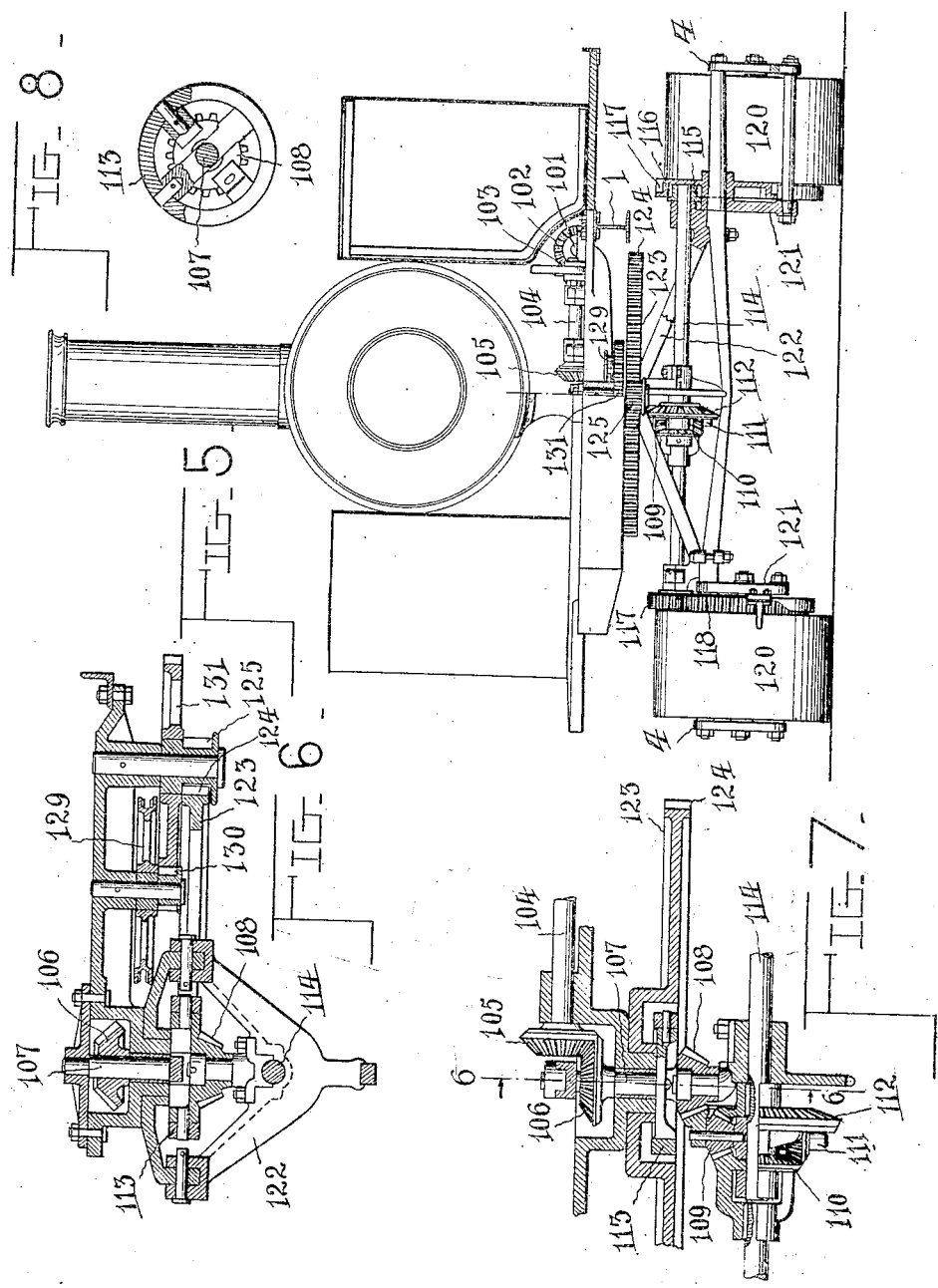

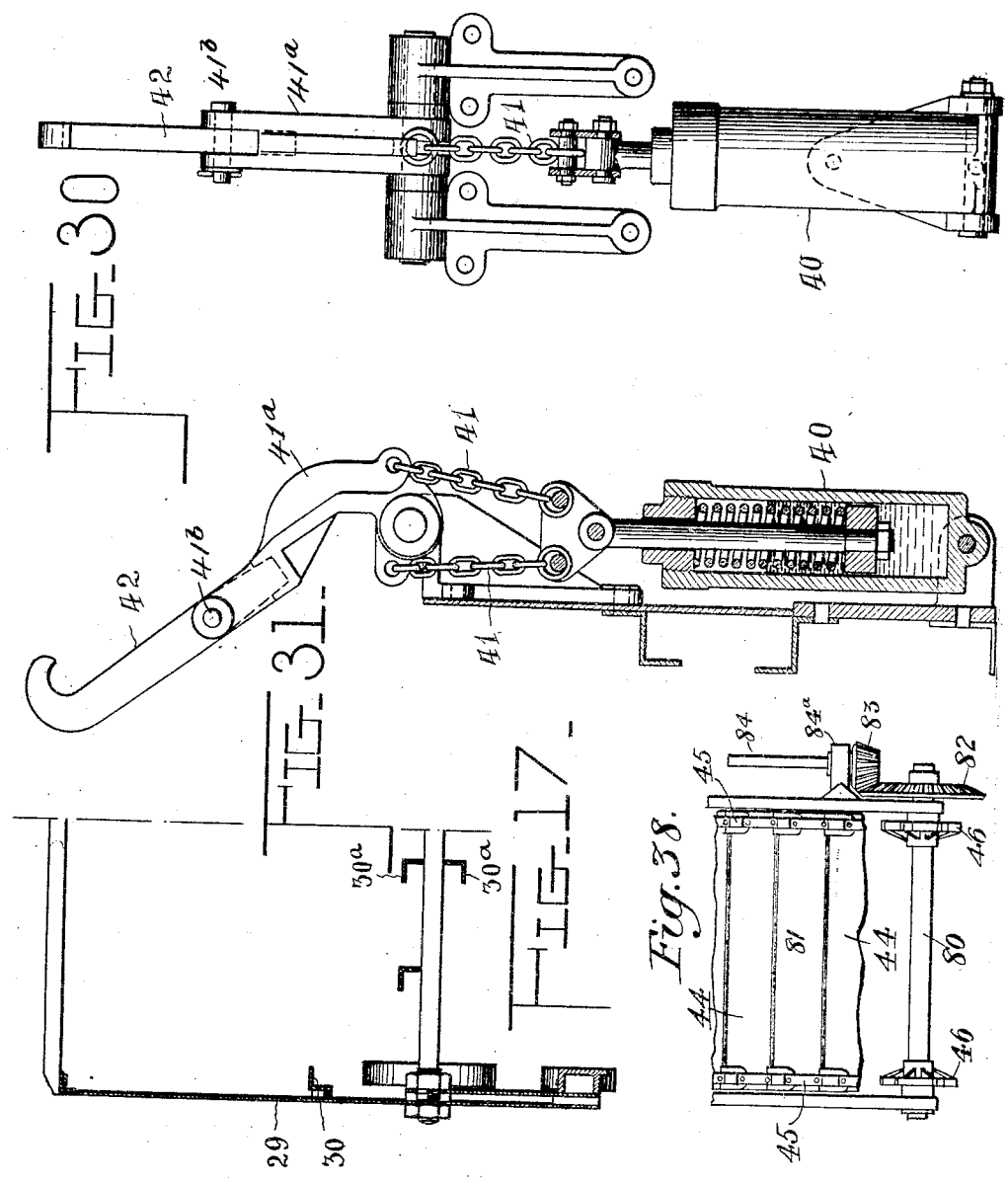

No. 779,415. PATENTED JAN. 10, 1905.
L. A. DÉSY.
TRENCHING MACHINE.
APPLICATION FILED APR. 11, 1904.
10 SHEETS—SHEET 7.
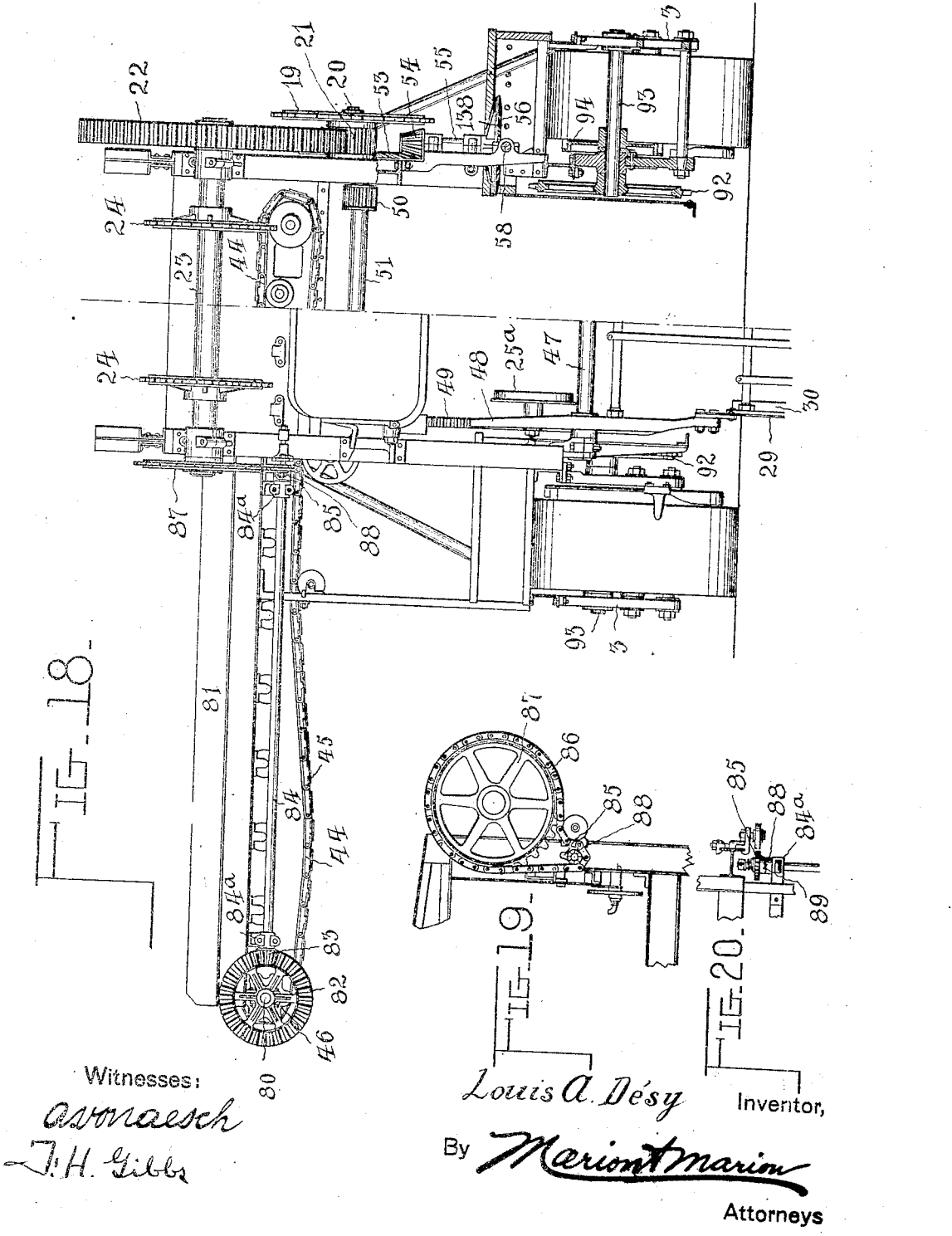
Witnesses:
Louis A. Désy  Inventor,
By Marion & Marion  Attorneys No. 779,415. PATENTED JAN. 10, 1905.
L. A. DÉSY.
TRENCHING MACHINE.
APPLICATION FILED APR. 11, 1904.
10 SHEETS—SHEET 8.
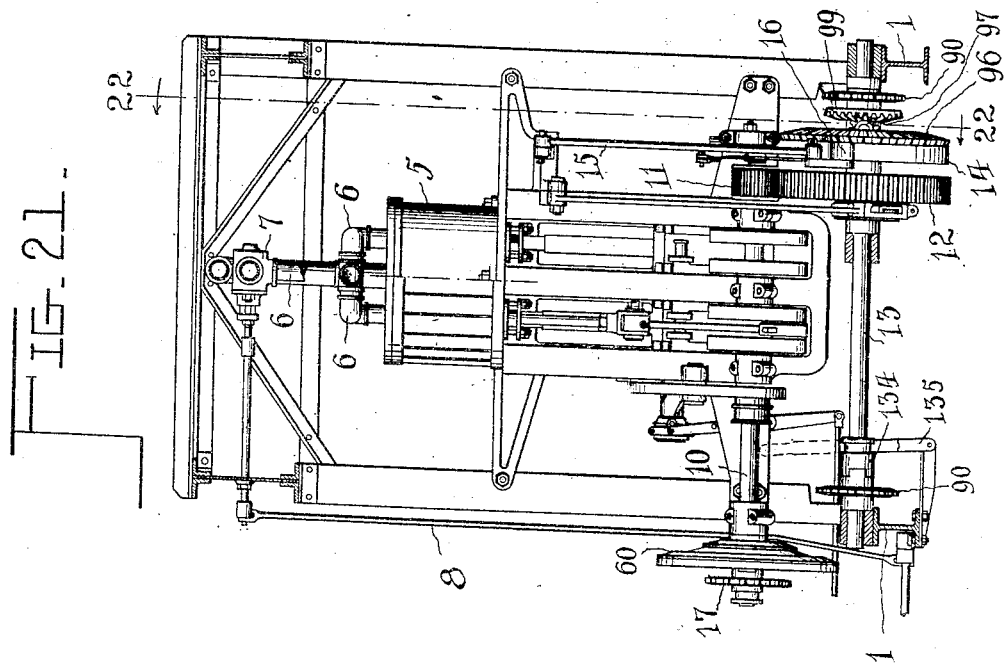
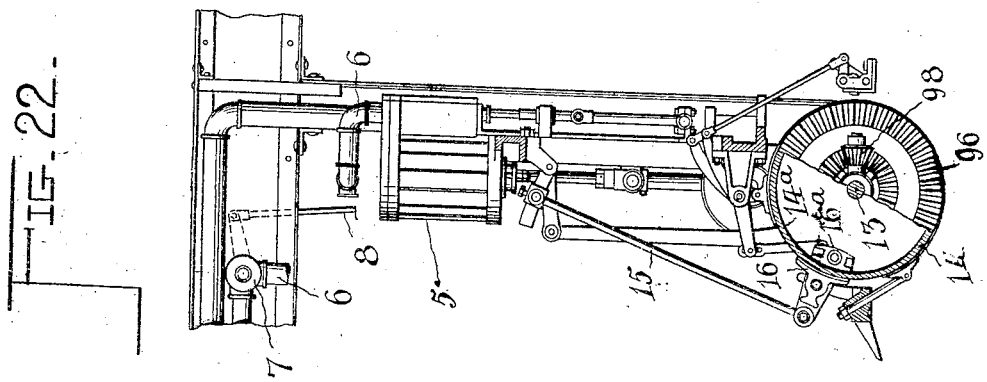
Witnesses:
A. von Aesch
Frederick H. Gibbs
Louis A. Désy Inventor,
By Marion Marion
Attorneys

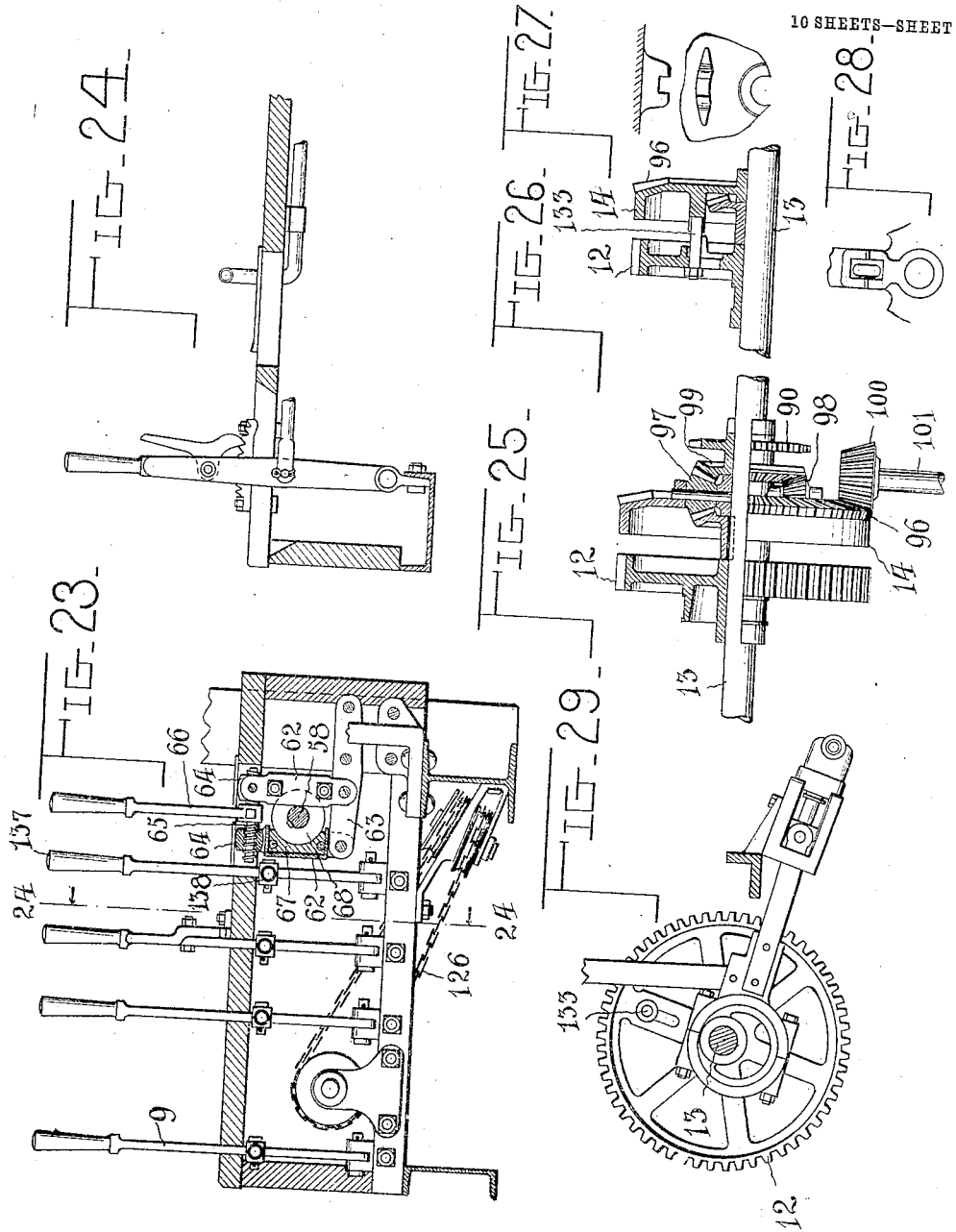

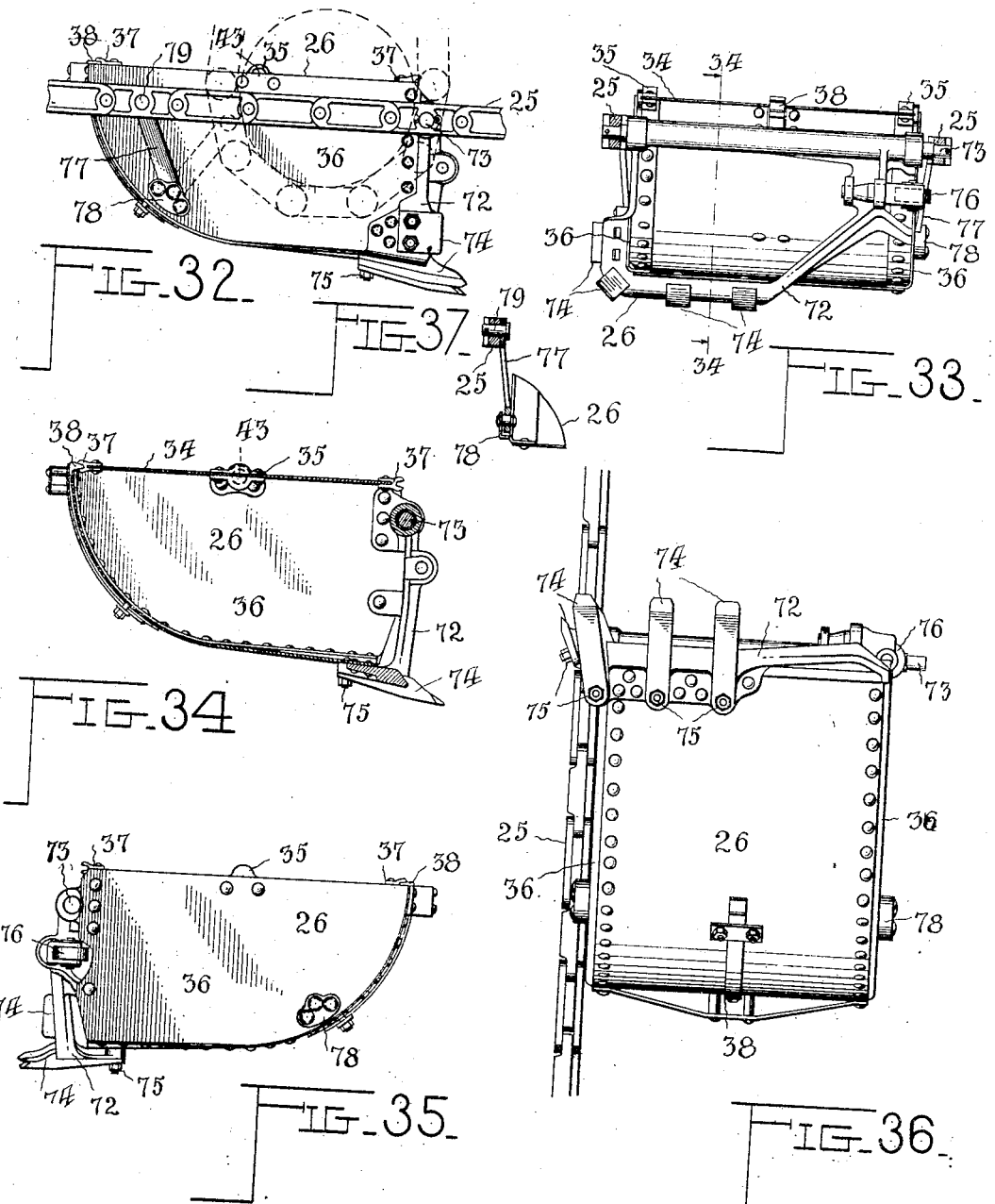

No. 779,415.

Patented January 10, 1905.

UNITED STATES PATENT OFFICE.

LOUIS ARSÈNE DÉSY, OF MONTREAL, CANADA, ASSIGNOR OF ONE-HALF TO WILLIAM J. POUPORE, OF MONTREAL, CANADA.

TRENCHING-MACHINE.

SPECIFICATION forming part of Letters Patent No. 779,415, dated January 10, 1905.

Application filed April 11, 1904. Serial No. 202,572.

*To all whom it may concern:*

Be it known that I, LOUIS ARSÈNE DÉSY, mechanical engineer, a subject of the King of Great Britain, residing in the city and district of Montreal, in the Province of Quebec, Canada, have invented certain new and useful Improvements in Trenching-Machines; and I do hereby declare that the following is a full, clear, and exact description of the invention, such as will enable others skilled in the art to which it appertains to make and use the same.

This invention relates to new and useful improvements in trenching-machines of the traction type which are self-propelled and which are adapted for use in digging trenches of the same or approximately the same width throughout their length, such as are used for laying sewers and for similar purposes.

The object of the invention is to provide in a machine of this class means whereby the trenching mechanism is positively driven from a convenient source of power carried upon the machine, the same source of power being utilized for propelling the machine over the surface of the ground in moving it from place to place and also for advancing the machine as may be necessary during the progress of the work accomplished thereby, the latter movement being at a much slower rate of speed than where the machine is transported under its own power from place to place.

In the construction of machines of this character it is advisable that the trenching mechanism comprising the buckets, conveyer-chains therefor, and the trench-frame into which the buckets are carried below the surface of the ground may be placed in different angles with respect to the surface of the ground for the purpose of digging trenches of different depths, the angle of inclination of the trench-frame determining, of course, the depth of cut of the buckets. To provide positive means for changing this angle of inclination under all conditions, it is essential that such means be power-driven and also that manually-operated means be provided for this purpose, so that when necessary the trench-frame, with its connected conveying mechanism, may be raised from the ground, as in case of injury to the power driving mechanism and it becomes necessary to move the whole apparatus for any cause.

In digging trenches it has been found advisable to cut from alternate sides thereof, because such cutting will produce less strain upon the bucket-carrying means than where a uniform cut extending across the trench and at the sides is made at one time, and means are provided in my improved machine whereby the buckets are provided with cutting means which may be disposed in such relation to the central longitudinal axis thereof that such cutting means will in one bucket be, say, on the left and under side thereof and upon the next succeeding bucket upon the right and under side thereof, while guide-rollers are connected to alternate sides of said buckets, so as to project the cutting mechanism into an engagement with the earth as the buckets are being driven therethrough. In this class of device it is preferable to use a bucket which has a pivotally-supported bottom plate, which bottom is tilted for the purpose of dumping the contents of the bucket onto a belt or apron extending transversely to one side of the main supporting-frame, and for the purpose of insuring a positive opening and closing of said pivoted bottoms it is essential that yielding means be provided adapted to engage with the bottoms when they pass a predetermined point with relation to such belt and to prevent unnecessary noise and pounding, which would lead to rapid destruction of parts. The trip for accomplishing this purpose is so supported and connected as to be cushioned in its movement after releasement of the pivoted bottom plate. To compensate for wear and to provide for possible destruction through accident, it is preferred that the trip proper shall be removable from its supporting and connected mechanism, and for that purpose I have devised a new and improved trip, illustrated herewith and hereinafter described. As the bottoms of the buckets are pivotally connected with the bucket-frame and such bottoms will remain at different angles of inclination with respect to the line of travel thereof after the contents of the buckets have been dumped, means are also provided for closing the said bottoms by pivoting the same upon their supports, such means being adapted to perform the necessary function regardless of the angle of inclination of such bottoms.

Other features of detail construction and arrangement of parts which relate to the operation and contribute to the utility of the improved trenching-machine are hereinafter described; and the invention consists in such detail construction and arrangement of parts, all as hereinafter more fully described, and specifically set forth in the claims.

In the annexed drawings similar numerals of reference indicate similar parts in all the views, wherein—

Figure 1 is a side elevational view of my improved machine shown supported upon suitable traction-wheels as in the act of digging a trench. Fig. 2 is a vertical sectional view taken vertically through what is hereinafter called the "trench-frame," showing such frame, with the conveyer-chains, supporting-rollers, buckets, operating-shaft for such conveyer-chains and buckets, and appurtenant connections relating thereto, as hereinafter described, the trench-frame in this view being shown as in a lowered position. Fig. 3 is a detached fragmentary view showing the rear supporting-wheels and a portion of the supporting-frame, with a fragment of the trenching-frame raised to an elevated position. Fig. 4 is a detail of a cover-closing roll supported in the trench-frame. Fig. 5 is a front elevational view of my improved machine, the right-hand portion of which is shown in section back of the first carrying-roll and the left-hand portion of which is shown in full lines from the front of the machine. Figs. 6, 7, and 8 illustrate details of construction relating to the supporting means and driving mechanism therefor from and to the forward traction-rollers. Fig. 9 is a plan view of the underframing of my improved machine. Figs. 10 and 11 are details relating to the means for steering and supporting the same. Fig. 12 is a detached vertical sectional view illustrating a portion of the driving mechanism for the rear trucks and means for raising the trench-frame. Fig. 13 is a detached detail view illustrating the driving-gearing for the front truck-frames more in detail. Fig. 14 is a detached sectional view taken on line 14 14 of Fig. 9 looking in the direction indicated by the arrow. Figs. 15 and 16 are details illustrating the construction of the trench-frame, the views being respectively a detached fragmentary view and a section taken on line 16 of Fig. 2. Fig. 17 is a section on line 17, Fig. 2. Fig. 18 is a view showing at the left-hand side of said figure a partial rear elevation and at the right-hand side of said figure a partial sectional view taken between the two carrying-wheels for the rear truck. Fig. 19 is a detached fragmentary view illustrating the manner of driving the apron or dumping-belt shown in Fig. 18. Fig. 20 is a detached detail view illustrating a clutch connected between the pinion shown in Fig. 19 and the shaft shown extending longitudinally of the apron of Fig. 18, the object of the clutch being to prevent movement of the said apron excepting in one direction. Fig. 21 is a fragmentary vertical section taken through the supporting-frame of the superstructure, showing the location of the driving-engine, its crank-shaft, and the main driving-shaft, which is geared therewith. Fig. 22 is a side elevational view of the parts shown in Fig. 21 looking in the direction indicated by the arrows. Fig. 23 is a detached fragmentary view illustrating the supporting means for operating-levers hereinafter described. Fig. 24 is a section on line 24 of Fig. 23. Fig. 25 is a detached fragmentary view, partly in section, showing the gearing illustrated in Fig. 9 approximately centrally thereof, said gearing controlling the steering mechanism of the machine. Fig. 26 is a detached detail illustrating the manner of connecting the friction-drive illustrated in Figs. 21 and 22 so as to permit the machine to be driven positively from the crank-shaft of the engine at a greater speed than would be possible by said friction-drive, as is necessary in moving the machine from point to point. Fig. 27 is a detail illustrating the manner of supporting the pin used for connecting the gears shown partially in Fig. 26. Fig. 28 illustrates the pin-socket of the larger gear shown at the left of Fig. 26. Fig. 29 is a detached view illustrating the pump-driving mechanism and the reciprocatory rod which is connected with the friction-drive hereinafter described. Fig. 30 is a rear elevational view of the bucket-trip-operating means. Fig. 31 is a vertical sectional view illustrating the details of construction thereof. Fig. 32 is a side elevational view of one of the buckets used with my improved machine. Fig. 33 is a front elevational view of the same. Fig. 34 is a section on line 34 of Fig. 33. Fig. 35 is a side elevational view looking in the opposite direction from that of Fig. 32. Fig. 36 is a bottom view of a bucket with one of its carrying-chains connected thereto. Fig. 37 is a fragmentary detail illustrating the bucket-hanger used for connecting the rear end of the bucket with the carrying-chain. Fig. 38 is a detail view showing the shaft 80 and sprocket 46 used for actuating the conveyer mechanism hereinafter described.

In the accompanying drawings, 1 indicates generally an underframing upon which the superstructure 2 is mounted, within which superstructure is held the water-tanks for supplying the engine-boiler, the driving-engine, the upper end of the trenching mechanism, and many of the appurtenant connections cooperating therewith for the purpose of regulating the operation thereof.

The underframing 1 is supported upon the rear truck 3, which is a relatively fixed truck, and is pivotally supported upon the forward truck 4, both of which are provided with traction-wheels, upon which the machine is carried, the forward truck being provided with steering mechanism, whereby it is caused to turn for the purpose of steering the apparatus in traveling from place to place.

5 indicates the driving-engine, which is of the reciprocatory type and is supplied with steam through steam-pipes 6 from a steam-boiler, (not shown,) which may be of any convenient type, a valve 7, with a valve-rod operating the same, controlling the supply of steam to said engine 5 and said valve-rod 8 being operated by the lever 9, which lever is shown in Fig. 23. The engine is directly connected to the crank-shaft 10, which shaft is provided with the pinion 11, meshing with the gear 12, which gear is loosely supported upon the driving-shaft 13. Upon the driving-shaft 13 is a friction-disk 14, and actuated by the engine 5 is a reciprocatory rod 15, carrying upon its lower end the friction-shoe 16, bearing upon the outer peripheral face of the said disk 14, and said brake-shoe is provided with an inner projecting portion 16$^a$, adapted to engage the inner peripheral face 14$^a$ of the said disk 14, which disk is provided with a laterally-projecting flange, as best shown in Figs. 21 and 22, so that as the engine is caused to reciprocate a reciprocatory movement is imparted to the friction driving-rod 15 and thence intermittently through the shoes 16 and 16$^a$ to the disk 14, thereby to drive the shaft 13. Upon the crank-shaft 10 is supported a sprocket-wheel 17, with which engages the sprocket-chain 18, said chain extending thence over the large sprocket-wheel 19 upon the shaft 20, while the pinion 21 on said shaft 20 meshes with the larger gear 22 upon the shaft 23. Carried on the shaft 23 are sprockets 24, which are adapted for use in driving the conveyer-chains 25, which engage with said sprockets, and upon which conveyer-chains buckets 26 are supported, said buckets passing over the driving-sprocket 24, thence downwardly around the guide-roller 27, its companion roller 28, and thence down the trench-frame 29, within which it is guided by the inwardly-projecting angle-irons 30, which extend longitudinally of said trench-frame and serve as guides to prevent excessive torsional movement of the said chains. An idler 31 is journaled upon the shaft 32 within said trenching-frame 29, near the lower end thereof, about which idler said chains pass. Said chains thence extend upwardly, as best shown in Fig. 2, and over the idler 33 shown in that figure, from whence the chains extend again to the driving-sprocket 24.

The buckets used with my apparatus are preferably of the self-dumping type and are provided with pivoted bottom portions 34, which are supported in bearings 35, connected with the side walls 36 of the said buckets, said covers 34 having end castings 37 thereon, extending transversely thereof, which castings are provided with recesses or seats, whereby the spring-fingers 38 engage with said seats and lock the bottoms 34 normally in position to support a load.

Supported in convenient position upon an upright 39 of the frame of the superstructure of my improved machine is a cylinder 40, having a plunger therein, and connected with said plunger are chains 41, which connect with a pivoted lever 41$^a$, terminating in the hook 42, the said hook lying normally in such position as to project into the plane occupied by the end casting 37 on the cover 34, so that when the buckets are moved in the direction indicated by the arrow in Fig. 2 the hook 42 will engage such end casting and by reason of such engagement cause the bottom to rotate upon its pivot 43, thereby ejecting any load which may be within the bucket at that time and causing the same to drop upon the apron or carrying-belt 44, which carrying-belt may consist of any suitable conveyer, though, as shown in Fig. 18, said belt is preferably driven by means of sprocket-chains 45, passing over the sprocket 46, and suitable idlers at the opposite end and at proper intervening portions for suitably supporting said conveyer-belt. By reason of the frequent contact of the covers with the hook 42 it is evident that such hook is liable to distortion or breakage, in which case a new hook must be quickly substituted to permit continued operation of the machine. To permit this, the hook 42 is locked in the bifurcated end of the lever 41$^a$ by means of the removable pin 41$^b$, and if a hook 42 is injured all that is required is that the pin 41$^b$ shall be removed and a new hook 42 be substituted.

The upper end of the trench-frame 29 is pivotally supported upon the shaft 47, while an upwardly-projecting bracket 48, rigidly connected therewith, terminates in the rack or segment 49, with which engages the pinion 50 upon the shaft 51, whereby upon rotation of the said pinion 50 the angularity of the trenching-frame 29 with relation to the ground may be carried within the limits of the said segment 49, said segment being preferably covered by means of the shield 52. (Shown in Figs. 2 and 3.) Upon said shaft 51 is supported a bevel-gear 53, in mesh with which is a bevel-pinion 54 upon a vertical shaft 55. Upon the lower end of the shaft 55 is a horizontally-disposed bevel-gear 56, in mesh with which is a pinion 57 upon the longitudinally-extended shaft 58.

The shaft 58 terminates in a hand-wheel 59, whereby through said hand-wheel and the gears described the shaft 51, carrying the pinion 50, may be rotated manually, if desired, for the purpose of raising and lowering the trench-frame 29 whenever it may be desired to do so and no steam-power is available for that purpose. Upon the crank-shaft 10 is a friction-disk 60, while a friction-wheel 61 on the shaft 58 is in a position to engage with said disk, so as to rotate the shaft 51 and through the gears 56 57, &c., rotate the said pinion 50 and in that manner cause a change in the elevation of said trenching-frame when power is available for that purpose. Intermediate the ends of the shaft 58 a friction-brake is provided adapted to regulate movement of said shaft 58 under the influence of the friction-disk and rollers 60 and 61, the said brake comprising oppositely-disposed hangers 62, (see Fig. 23,) which are pivotally supported upon the link 63 and are provided at or near their upper ends with the screw-threaded boxes 64, with which engage the oppositely-projecting screw-threaded sections 65. Keyed upon said screw-threaded sections 65 is a lever 66, rigidly connected therewith.

As the screw-threads are oppositely disposed, it will be obvious that upon movement of the lever 66 in either direction the shoes 67 will be projected away from or nearer to the friction-disk 68 upon said shaft 58, to which said disk is keyed. Therefore the friction of the roll 61 may be neutralized by the brake thus described, or if the brake is thrown off the said shaft may be driven either by the hand-wheel 59 or the friction-disk 61, as before described. It is evident that the gearing thus described is so connected as to tend normally to project the lower end of the trenching-frame forwardly—that is, in the line of work—whereby the friction means described serves the purpose of keeping the conveyer-buckets properly supported in such position as to be most effective for the purpose of digging the trench.

Within the trench-frame is supported a roller 69, (shown in section in Fig. 4,) said roller being supported between the angle-irons 30ᵃ in such position as to impinge the advance end, as 37, of a bucket in the event that the bottom of said bucket is not firmly closed and locked in position. The chains riding under the angle-irons will draw said bottom into close contact with such roll 69, thereby closing the bottom and placing the bucket in position for operation.

At the upper side of the structure and supported upon the standards 70 is an approximately wedge-shaped bracket or extension 71, the apex of which projects horizontally over the belt 44 and is in such position as to be adapted to impinge a bottom 34 if it should chance to fail to close before reaching said projection.

It will be noted that the projection 71 is provided with an upper and a lower inclined face, and the object of these faces, with the acute angle formed therebetween, is to provide positive means for closing the covers 34 regardless of their angularity with the line of travel thereof. If the doors are open to an appreciable degree, they will project below the apex of the bracket 71, striking the lower face thereof and causing said cover to rotate upon its axis as the bucket passes above the member 71, thereby causing a complete rotation of the bottom. If, however, the bottom is nearly closed, it will be evident that the advance end thereof will strike the upper face of the bracket 71 and riding thereupon will be closed by the upward inclination of said member 71 toward the supporting-post 70, thus insuring a closing of the buckets as they pass over the said bracket 71. Thus it will be evident that my trenching-machine is admirably adapted for digging trenches of uniform width, such as gas-pipe, water-main, or sewer trenches. It is arranged in such manner that with the same scoop-operating devices the parts can be readily adjusted to dig a deep or shallow trench. Thus should the scoop-carrying frame occupy an approximately vertical position the depth of trench dug thereby will be determined by the length of the trench-frame; but when the angle of inclination of the trench-frame is varied to raise its lower end nearer the surface of the ground the depth of the trench will be proportionately less.

To provide against excessive draft upon the sprocket-chains 25, I prefer to provide the buckets with cutting-teeth so arranged that one bucket will cut from the side and a portion of the width thereof and the next succeeding bucket will be cut from the opposite side of the trench and the intervening transverse portion thereof, whereby the strain upon the chains 25 is to a great extent neutralized, as each bucket performs only the work necessary to excavate for a portion of the width of the trench. To provide a more secure and lasting means for excavation, I prefer that the buckets 26 shall be supported upon the chains 25 by means of yokes 72, which yokes are pivotally connected to the chains 25 by means of pivots 73, projecting laterally from said yokes 72, the yokes being connected with and extending slightly beyond the forward ends of the buckets 26. Cutting-teeth 74 are connected with the yokes 72 by means of bolts or rivets 75, though preferably bolts are used, so that the said cutting-teeth may be removed, if desired, as for sharpening or renewal. Pivotally supported within the yokes 72 are rollers 76, which rollers project laterally beyond the side walls 36 of said buckets, as shown in Figs. 33, 35, and 36. But one roller is attached to each bucket, and each roller projects in an opposite direction, the rollers being upon the sides of the buckets opposite that from which the teeth 74 project, so that as the buckets are drawn to position for cutting the earth the rollers 76, bearing against the side walls of the trenching-frame, will hold the cutting-teeth in position for doing the most effective work, thereby insuring, with the proper number of buckets and proper alternate arrangement of cutting-teeth and rollers, a uniform width of trench.

As the chains 25 are not always extended in a right line, but are necessarily bent around the idlers and supporting-rollers, it is necessary that the end of the bucket opposite the journals 73 shall be yieldingly connected with the said chains, and for that purpose the hangers 77 are provided, said hangers being pivotally connected with the brackets 78 upon the rear end portion of the buckets 26 and being connected, by means of the laterally-projecting pintles 79, with the said chains 25, whereby more or less flexibility is provided for the connection of said buckets.

Material excavated and lifted above the ground-level by the buckets is deposited upon said belts 44, which, with the chains 45, comprise a conveyer. This conveyer is supported in position and extends laterally from the superstructure of the machine, as shown in Fig. 18. A shaft 80, upon which the sprocket 46 is supported, extends transversely of the conveyer-apron 81 at the outer end thereof, as shown in Fig. 18, and a bevel-gear 82 is carried on said shaft.

Meshing with the gear 82 is a bevel-pinion 83, which is held upon a shaft 84, extending longitudinally of said apron 81, and is supported in suitable bearings 84ª near each end thereof.

Approximately at the inner end of the shaft 84 is a sprocket 85, on which runs the chains 86, said chain running thence over the larger sprocket 87 upon the said shaft 23, whereby as said shaft 23 rotates to hoist the buckets 26 the belt 44 will be driven at the required speed to quickly carry away any material dumped thereupon from said buckets.

As it may be necessary in some instances to reverse the direction of travel of the buckets, means should be provided to prevent a reverse movement of the conveyer-belt 44, which would cause the earth thereupon to be again deposited in the excavation already made. For this reason a clutch 88 is interposed between the shaft 84 and the sprocket 85, which clutch is shown in Fig. 20, and comprises oppositely-disposed ratchet-teeth 89, so arranged that when the chain 86 is driven in the proper direction to impart forward movement of the conveyer said teeth will be in engagement, but when said chain is oppositely driven the said teeth 89 will slip and permit the conveyer to remain stationary, thus preventing return of material dumped thereupon.

The rollers 27 and 28 are supported in pivoted arms 27ª and 28ª, which are pivotally connected together, as shown in Fig. 3, thereby forming a guide for the rearmost chain in any position in which it may be placed, while the idler 25ª serves as a guide for the forward chain when the trenching-frame is elevated, as shown in that figure.

Upon the shaft 13 are sprockets 90, and chains 91 pass over said sprockets and thence over sprockets 92, mounted between the rear supporting-wheels, which wheels are of the traction type with broad tread portions. Mounted in the truck-frame 3 is a transverse shaft 93, on which said sprocket 92 is carried, and on this shaft is a gear 94, which meshes with other gears which drive the gears 95, mounted on the rear traction-wheels. Thus as the shaft 13 is rotated by the friction means described the rear traction-wheels will be driven slowly forward, causing progression of the entire apparatus.

A bevel-gear 96 is connected with the flanged disk 14, and compensating gears 97 and 98 are connected therewith to permit the rear wheels to be driven at different rates of speed, as may be required in turning corners, &c. (See Fig. 25.) The said gears are in mesh with the bevel-gears 99ª and 99, which latter are connected with the hub upon which the sprocket 90 at one side of the machine is placed.

In mesh with the gear 96 is a bevel-pinion 100 on the shaft 101, which extends longitudinally of the machine, as shown in the plan view, Fig. 9, and on the forward end of this shaft is a bevel-gear 102, meshing with the bevel-gear 103 on the short shaft 104, which shaft has another bevel-gear 105 at its opposite end.

Meshing with the gear 105 is a pinion 106, (see Fig. 7,) which is at the upper end of the vertical shaft 107, which shaft carries universal gears comprising the elements 108, 109, 110, 111, and 112, which are in mesh and so connected with the spider 113 as to permit great freedom of play between said parts, as in passing over uneven surfaces, yet so controlling them that the shaft 114 is positively driven from the shaft 101.

On the shaft 114 is a pinion 115, which meshes with the internal rack 116, Fig. 13. On the same annulus as 116 is an external gear 117, which meshes with the external gears 118 and 119, which latter are carried on the forward traction-wheels 120.

The front truck-frame comprises the yokes 4, in which the traction-wheels are mounted, and to said yokes are connected brackets 121, while cross-ties 122 serve as supports for the supporting-platform 123, (shown in Fig. 10,) the said parts being secured together, as shown, whereby the entire weight of the forward structure is carried upon said yokes and brackets and thence to the traction-wheels 120. The platform 123 is pivotally supported on the shaft 107 and is provided with a rack 124, with which meshes the pinion 125.

Extending longitudinally of the underframe are chains 126, which pass over guide-rollers 127 and 128 and thence around the wheel or drum 129 on the shaft with which is a pinion 130 in mesh with the gear 131.

On the shaft with gear 131 is said pinion 125, which is in mesh with the rack 124, so that as the chains 126 are manipulated the forward truck may be moved to the right or left through the instrumentality of said connected gearing.

When it is desired to move the machine from place to place, a pin 133 is used to connect the disk 14 with the large gear 12, as shown in Fig. 26, whereupon power from the crank-shaft 10 will be communicated to the shaft 13 through the pinion 11 on said crank-shaft. It will be understood that the gear 12 is normally freely rotatable on the shaft 13 and the flanged disk 14 is keyed thereupon, as shown in the broken view, Fig. 25, whereupon power from said shaft will be communicated to the traction-wheels through the hereinbefore-described connections, in which case the proper lever will be thrown, and through well-understood and common mechanism the bucket-operating mechanism will be cut out so as to remain inactive, the trench-frame in the meantime having been elevated from the ground.

The clutch 134 on shaft 13 is provided to throw out of connection the sprocket 90, (shown at the left-hand side of Fig. 21,) whereby, if desired, differential movement may be imparted to the right and left traction-wheels, and either may be driven without driving the others, the lever 135 being provided to regulate the action of said clutch.

It will be noted that the friction-roller 61 is held in the yoke 136, (see Fig. 14,) and said yoke is controlled by the lever 137 (shown in Fig. 23) through suitable connecting-rods 138 and 139, whereby the friction-roller 61 may be caused to bear upon its driving-disk or released therefrom, as may be desired.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim as new, and desire to secure by Letters Patent, is—

1. In a trenching-machine, bucket-carrying chains, shafts connecting said chains, buckets on said shafts, and means on said buckets adapted to move them longitudinally of said shafts.

2. In a trenching-machine, bucket-carrying chains, buckets thereon, shafts connecting said chains on which shafts said buckets are journaled, and auxiliary hangers pivotally connected with said chains and near the opposite ends of said buckets.

3. In a trenching-machine, bucket-carrying chains, buckets thereon, shafts connecting said chains on which said buckets are journaled, auxiliary hangers pivotally connecting the opposite end portions of said buckets with said chains, and guide-rolls adapted to shift said buckets longitudinally on their supporting-shafts.

4. In a trenching-machine, a bucket comprising a receptacle, a supporting-yoke connected therewith, a carrying-chain with which said yoke is connected, and cutting-teeth on said yoke.

5. In a trenching-machine, a bucket comprising a receptacle, a hinged closure therefor, a spring-catch coöperating with said closure, a supporting-yoke approximately surrounding the forward end of said bucket, cutting-teeth on said yoke, and means for supporting the opposite end portions of said bucket.

6. In a trenching-machine, a bucket, a supporting-yoke at the forward end thereof, cutting-teeth connected with said yoke, and a laterally-projecting guide-roller projecting from one side of said yoke.

7. In a trenching-machine, a bucket, a supporting-yoke near one end thereof, cutting-teeth connected with said yoke, a shaft journaled in the yoke, and a guide-roller projecting laterally beyond the bucket at one side whereby the said bucket is shifted laterally.

8. In a trenching-machine, a bucket open at one side, a yoke near the open side serving as a support for said bucket, removable cutting-teeth connected with said yoke, a laterally-projecting guide-roll approximately on the opposite side of the bucket from some of said teeth, and a supporting-shaft on which said yoke is journaled.

9. In a trenching-machine, a bucket open at its advance end, cutting means thereat, a supporting-yoke surrounding the cutting portion of said bucket, and a transversely-extending shaft on which said yoke is journaled.

10. In a trenching-machine, a carrying-chain, a bucket, a yoke connecting said bucket with said chain, cutting-teeth on said yoke, and a hanger pivotally connecting said chain with the opposite end portion of said bucket.

11. In a trenching-machine, a carrying-chain, a bucket, a yoke projecting forwardly of said bucket and laterally thereof to one side, cutting-teeth connected with the transverse arm, and with one vertical arm of said yoke, and a guide-roller projecting laterally beyond the opposite vertical arm of said yoke.

12. In a trenching-machine, a carrying-chain, buckets thereon, pivoted bottoms in said buckets, a trenching-frame, actuating means and guide-rollers on which said chains are carried, means for opening said buckets, and an approximately wedge-shaped stop adapted to close said buckets.

13. In a trenching-machine, trenching-buckets with centrally-pivoted bottoms, carrying means therefor, means for opening said buckets, and means for closing said buckets regardless of the degree of opening.

14. In a trenching-machine, a supporting-frame, a movable carrying-chain, buckets thereon, supporting-yokes on said buckets and journals in said yokes hung in said chains, in combination with pivoted bottoms connected with said buckets, and an approximately wedge-shaped stop on said frame, the said stop serving to swing said bottoms in either direction to close the same in passing.

15. In a trenching-machine, a supporting-frame, a movable carrying-chain, buckets thereon, pivoted bottoms for said buckets adapted to swing to an approximately vertical position, and a rigid approximately wedge-shaped stop in the line of travel of said bottoms when open.

16. In a trenching-machine, trenching-buckets, pivoted hangers therefor, knives on said hangers below said buckets, pivoted bottoms in said buckets, a pivoted trip in the path of said bottoms, a spring-actuated plunger connected with said trip, and a cushion for said plunger.

17. In a trenching-machine, means for tripping bucket-sections comprising a pivoted trip, a reciprocatory plunger connected therewith, a spring for actuating said plunger, and a cushion coöperating therewith.

18. In a trenching-machine, a bucket-trip comprising a pivotally-supported lever, a cylinder, a reciprocatory piston therein, a piston-rod, and means for connecting said piston-rod and said lever.

19. In a trenching-machine, a bucket-trip comprising a hooked lever, a fixed pivot therefor, a fluid-cylinder, a piston reciprocatory therein, a piston-rod, a spring bearing against said piston, a rockable member connected with said rod, and connecting means between said rockable element and said lever.

20. In a trenching-machine, a bucket-trip comprising a fluid-cylinder, a reciprocatory piston therein, a piston-rod, a spring on said piston-rod bearing against said piston, a rockable member connected with said rod, a lever having an engaging hook at one end, a pivot therefor, extensions on said lever at substantially opposite sides of its pivot, and means connected with said extensions and said first rockable member.

21. In a trenching-machine, a bucket-trip comprising a fluid-cylinder, a piston reciprocatory therein, a piston-rod, a spring bearing on said piston, a rockable lever connected with said rod, and a removable bucket-engaging hook connected therewith.

22. In a trenching-machine, a bucket-trip comprising a removable hook, a pivotally-supported lever carrying the same, and a reciprocatory plunger connected with said lever.

23. In a trenching-machine, a bucket-trip comprising a removable hook, a pivotally-supported lever carrying the same, a reciprocatory plunger connected with said lever, and cushioning means for said plunger.

24. In a trenching-machine, a bucket-trip comprising a removable hook, a lever with which said hook is rigidly connected, a pivot for said lever, a projection on the lever at approximately opposite sides of said lever, a fluid-cylinder, a plunger therein, a spring bearing on said plunger, a rockable member on the outer end of said plunger, and a plurality of connecting means therefrom to the said lever projections.

25. In a trenching-machine, a positive bucket-driving means, and a friction driving means for simultaneously propelling the machine forward.

26. In a trenching-machine, a positive bucket-driving means, and a reciprocatory friction driving means for changing the position of the machine while the buckets are in operation.

27. In a trenching-machine, a trench-frame, buckets guided therein, means for driving said buckets, and friction-driven means for varying the angle of said trench-frame.

28. In a trenching-machine, a chain-and-bucket conveyer in positive connection therewith, a pivotally-supported trench-frame including substantially parallel side sheets, angle-irons projecting inwardly of said side sheets to guide said chains.

29. In a trenching-machine, a plurality of conveyer-chains, buckets thereon, a driving-shaft with sprockets thereon engaging said chains, a laterally-projecting conveyer, a conveyer-platform, a transverse shaft at the outer end thereof, a sprocket on said shaft engaging said conveyer, a bevel-gear on said shaft extending longitudinally of said conveyer, a sprocket on the inner end of said shaft, a chain passing over said sprocket, and a larger sprocket on said first-mentioned driving-shaft.

30. In a trenching-machine, a driving-engine, a driven shaft, a friction member thereon, a reciprocatory shoe coöperating therewith, a loose gear on said driven shaft adapted to be locked to said friction member, a pinion in mesh with said gear, the pinion being positively driven by the engine, and connections from said shaft to traction-wheels adapted to propel said machine over the ground at varying speeds.

In witness whereof I have hereunto set my hand in the presence of two witnesses.

LOUIS ARSÈNE DÉSY.

Witnesses:
FREDERICK H. GIBBS,
J. A. MARION.